United States Patent
Sasaki et al.

(10) Patent No.: US 12,346,454 B2
(45) Date of Patent: *Jul. 1, 2025

(54) SYSTEM, METHOD, AND NON-TRANSITORY COMPUTER-READABLE MEDIUM

(71) Applicant: NEC Corporation, Tokyo (JP)

(72) Inventors: Takayuki Sasaki, Tokyo (JP); Yusuke Shimada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 412 days.

This patent is subject to a terminal disclaimer.

(21) Appl. No.: 18/007,779

(22) PCT Filed: Jun. 5, 2020

(86) PCT No.: PCT/JP2020/022396
§ 371 (c)(1),
(2) Date: Dec. 2, 2022

(87) PCT Pub. No.: WO2021/245939
PCT Pub. Date: Dec. 9, 2021

(65) Prior Publication Data
US 2023/0229783 A1 Jul. 20, 2023

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
CPC ... G06F 21/577; G06F 2221/033; G06F 21/56
See application file for complete search history.

(56) References Cited

U.S. PATENT DOCUMENTS

| | | | |
|---|---|---|---|
| 9,811,665 B1* | 11/2017 | Xu | G06F 21/562 |
| 10,581,874 B1* | 3/2020 | Khalid | H04L 63/1425 |
| 2019/0053053 A1* | 2/2019 | Skvortsov | G06Q 20/108 |

FOREIGN PATENT DOCUMENTS

| | | |
|---|---|---|
| JP | H11-282672 A | 10/1999 |
| JP | 2005-222341 A | 8/2005 |

(Continued)

OTHER PUBLICATIONS

JP Office Action for JP Application No. 2024-029500, mailed on Oct. 8, 2024 with English Translation.

(Continued)

*Primary Examiner* — Harunur Rashid

(57) ABSTRACT

The present disclosure aims to provide a backdoor inspection device, a user device, a system, a method, and a non-transitory computer-readable medium that can increase trustability of software as to whether or not there is a backdoor in the software. A system according to the present disclosure includes: a plurality of backdoor inspection devices; a plurality of databases; and a user device, in which the backdoor inspection device includes: a backdoor presuming means for performing backdoor inspection on a prescribed software installed in a counterpart device that communicates with the user device and presumes whether or not there is a backdoor in the prescribed software; a certificate issuance means for issuing a backdoor inspection certificate including a result of the backdoor inspection, the database includes: a registration means for registering the backdoor inspection certificate; and a transmission means for transmitting the backdoor inspection certificate.

12 Claims, 4 Drawing Sheets

(56) References Cited

FOREIGN PATENT DOCUMENTS

| | | |
|---|---|---|
| JP | 2007-095043 A | 4/2007 |
| JP | 2010-165231 A | 7/2010 |
| JP | 2013-232826 A | 11/2013 |
| JP | 2016-521079 A | 7/2016 |
| JP | 2017-505944 A | 2/2017 |

OTHER PUBLICATIONS

Takayuki Sasaki et al., "Network Access Control Based on Backdoor Inspection Result", Proceedings of 2020 Symposium on Cryptography and Information Security (SCIS 2020), The Institute of Electronics, Information and Communication Engineers, Jan. 21, 2020, pp. 1-6.
International Search Report for PCT Application No. PCT/JP2020/022396, mailed on Aug. 11, 2020.

* cited by examiner

SYSTEM, METHOD, AND NON-TRANSITORY COMPUTER-READABLE MEDIUM

This application is a National Stage Entry of PCT/JP2020/022396 filed on Jun. 5, 2020, the contents of all of which are incorporated herein by reference, in their entirety.

TECHNICAL FIELD

The present disclosure relates to a system, a method, and a non-transitory computer-readable medium, in particular, to a system, a method, and a non-transitory computer-readable medium that can increase trustability of software as to whether or not there is a backdoor in the software.

BACKGROUND ART

In recent years, infrastructures and enterprise systems that support daily lives have become complicated, and therefore such infrastructures and enterprise systems are difficult to be constructed only with devices (equipment) of only one company. Thus, devices are procured from outside suppliers, and the procured devices are combined or incorporated and constitute the infrastructure or enterprise system. When an infrastructure or an enterprise system is constructed, manufacturers of the procured devices and a manufacturing and distribution chain are handled as being assumed to be trustful. However, there have been many reports of events (incidents) in which a hidden or unexpected function that a user (a person who embeds devices) is not aware of in terms of software, firmware, and hardware of such embedded devices is found. Therefore, the assumption that the device manufacturers and the manufacturing and distribution chain are trustful is no longer valid, and a method of detecting a rogue function in software, namely, a method of detecting a backdoor, has been proposed.

Patent Literature 1 discloses that an approach for performing off-line malware detection, and in addition a real-time malware detection testing is provided. Patent Literature 1 discloses that an off-line malware detection testing may include: detecting function calling map of the application offline; recording, in a function calling map, relationships of callings among functions called by the application; extracting patterns of the function callings of the application from the function calling map; and comparing the extracted pattern with the basic patterns of normal applications. Patent Literature 1 discloses that the real-time malware detection may include running an application in real environment; recording behaviors of the application at runtime of the application; extracting behavior patterns from the recorded behaviors; and comparing the extracted behavior patterns with the basic patterns of normal application or the patterns previously recorded for the application.

Patent Literature 2 discloses a method and apparatus for verifying data for use on an aircraft. Patent Literature 2 discloses that: a plurality of digital certificates associated with the data are received by a processor unit; the processor unit determines whether one of the plurality of digital certificates is compromised; the processor unit selects a selected number of the plurality of digital certificates in response to a determination that the one of the plurality of digital certificates is compromised; and the processor unit verifies the data for use on the aircraft using the selected number of the plurality of digital certificates.

CITATION LIST

Patent Literature

Patent Literature 1: Published Japanese Translation of PCT International Publication for Patent Application, No. 2017-505944
Patent Literature 2: Published Japanese Translation of PCT International Publication for Patent Application, No. 2016-521079

SUMMARY OF INVENTION

Technical Problem

A method taken for detecting a backdoor often involves false detections (erroneous detections) and therefore, in the case where inspection of a backdoor is performed using only one certification authority (a backdoor inspection device), some backdoors are not detected. Further, in the case where detection of backdoors is performed on software of a large-scale or detection of backdoors contained in a plurality of software used by one device (equipment) is performed, there are many software that are the targets of inspection (analysis), and thus there has been a problem that it is difficult to inspect all of the software by depending on only one certification authority (a backdoor inspection device).

An object of the present disclosure is to provide a system, a method, and a non-transitory computer-readable medium that solve any of the above-described problems.

Solution to Problem

A system according to the present disclosure includes:
a plurality of backdoor inspection devices;
a plurality of databases; and
a user device, wherein
    each of the plurality of the backdoor inspection devices includes:
        a backdoor presuming means for performing backdoor inspection on a prescribed software installed in a counterpart device that communicates with the user device and presumes whether or not there is a backdoor in the prescribed software;
        a certificate issuance means for issuing a backdoor inspection certificate including a result of the backdoor inspection, each of the plurality of the databases includes:
        a registration means for registering the backdoor inspection certificate; and
        a transmission means for transmitting the backdoor inspection certificate, and the user device includes
        a communication counterpart verification means for acquiring the backdoor inspection certificate from each of the plurality of the databases and determining, based on a plurality of the backdoor inspection certificates, whether or not communication with the counterpart device is permitted.

A method according to the present disclosure for a system including:
a plurality of backdoor inspection devices;
a plurality of databases; and
a user device, wherein
    each of the plurality of the backdoor inspection devices is configured to:
        perform backdoor inspection on a prescribed software installed in a counterpart device that communicates with the user device and presume whether or not there is a backdoor in the prescribed software; and issue a backdoor inspection certificate including a result of the backdoor inspection, each of the plurality of the databases is configured to:
register the backdoor inspection certificate; and
transmit the backdoor inspection certificate, and the user device is configured to:
acquire the backdoor inspection certificate from each of the plurality of the databases; and
determine, based on a plurality of the backdoor inspection certificates, whether or not communication with the counterpart device is permitted.

A non-transitory computer-readable medium according to the present disclosure that stores a program that causes a computer to perform a method for a system including:

a plurality of backdoor inspection devices;
a plurality of databases; and
a user device, wherein
each of the plurality of the backdoor inspection devices is configured to:
perform backdoor inspection on a prescribed software installed in a counterpart device that communicates with the user device and presume whether or not there is a backdoor in the prescribed software; and
issue a backdoor inspection certificate including a result of the backdoor inspection,
each of the plurality of the databases is configured to:
register the backdoor inspection certificate; and
transmit the backdoor inspection certificate, and
the user device is configured to:
acquire the backdoor inspection certificate from each of the plurality of the databases; and
determine, based on a plurality of the backdoor inspection certificates, whether or not communication with the counterpart device is permitted.

Advantageous Effects of Invention

The present disclosure relates to a system, a method, and a non-transitory computer-readable medium, in particular, to a system, a method, and a non-transitory computer-readable medium that can increase trustability of software as to whether or not there is a backdoor in the software.

EXAMPLE EMBODIMENT

The following will describe example embodiments of the present invention with reference to the drawings. In each drawing, the same or corresponding elements are designated by the same signs, and duplicate description will be omitted as necessary for clarification of the description.

First Example Embodiment

Figure 1:
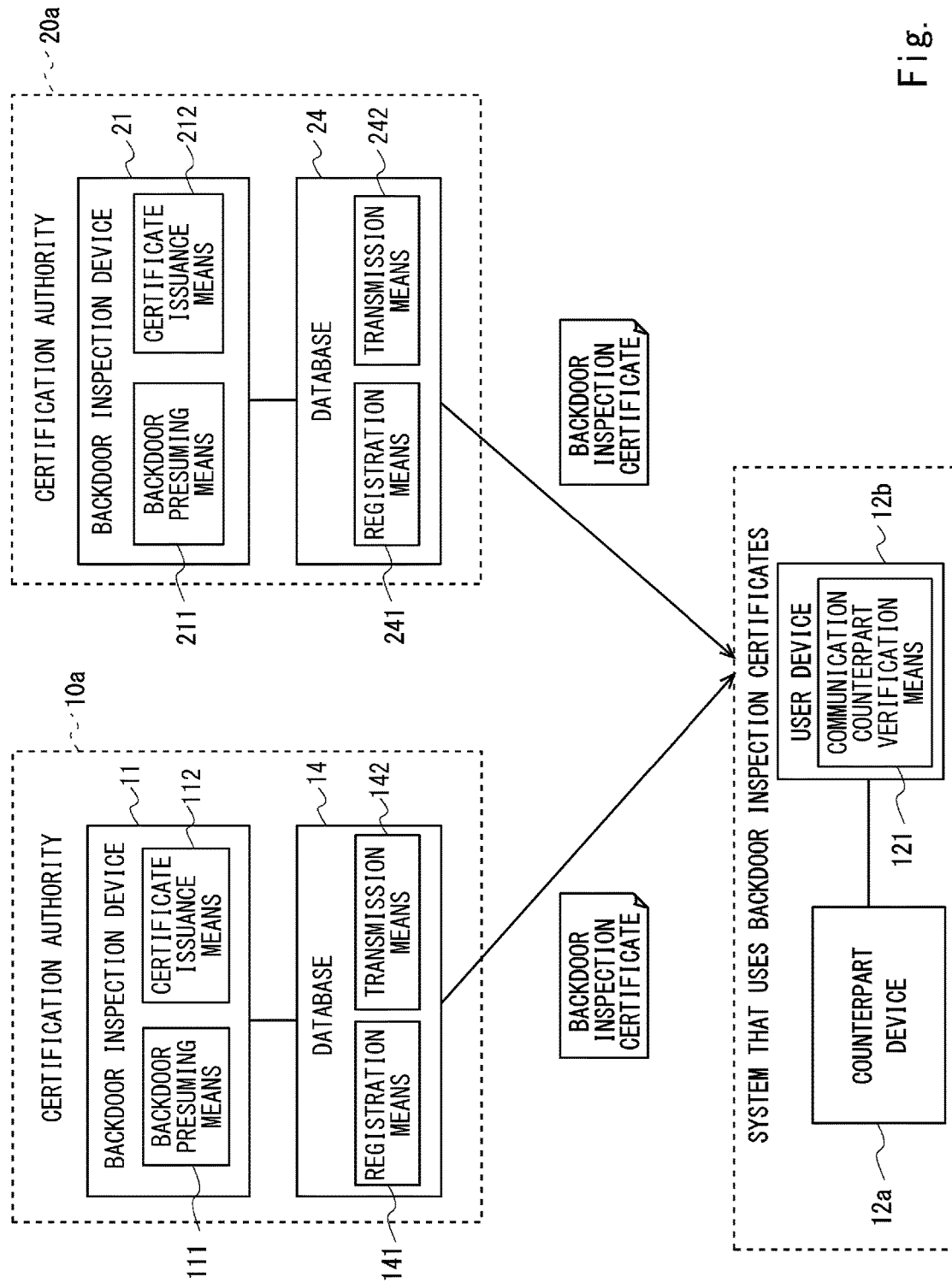
FIG. 1 is a block diagram illustrating a backdoor inspection device according to a first example embodiment.

An overview of a system according to a first example embodiment will be described. FIG. 1 is a block diagram illustrating the system according to the first example embodiment.

As illustrated in FIG. 1, the system 10 of the first example embodiment includes a plurality of backdoor inspection devices (e.g. a backdoor inspection device 11 and a backdoor inspection device 21), a plurality of databases (e.g. a database 14 and a database 24), and a user device 12b. The plurality of backdoor inspection devices are owned by the respective certification authorities for the respective backdoor inspection devices. Specifically, a certification authority 10a owns the backdoor inspection device 11 and the database 14, and a certification authority 20a owns the backdoor inspection device 21 and the database 24.

One of the plurality of the backdoor inspection devices, for example, the backdoor inspection device 11, has a backdoor presuming means 111 and a certificate issuance means 112.

The backdoor presuming means 111 performs backdoor inspection on a prescribed software installed in a counterpart device 12a that communicates with the user device 12b and presumes whether or not there is a backdoor in a prescribed software. Specifically, the backdoor presuming means 111 performs backdoor inspection on the prescribed software by analyzing the function and structure of the prescribed software and identifying a presumed code that is presumed to be a backdoor from the prescribed software. Such backdoor inspection is sometimes rephrased as estimation of whether or not there is a backdoor in the prescribed software performed by a certification authority.

Each of the plurality of the backdoor inspection devices (the backdoor inspection device 11 and the backdoor inspection device 21) may perform backdoor inspection on the entire prescribed software. That is, the backdoor inspection device 11 may perform backdoor inspection on the entire prescribed software and the backdoor inspection device 21 may also perform backdoor inspection on the entire prescribed software. Then, the user device 12b may determine presence or absence of a backdoor in the prescribed software based on a backdoor inspection certificate issued by the backdoor inspection device 11 and a backdoor inspection certificate issued by the backdoor inspection device 21.

Further, among the plurality of backdoor inspection devices (the backdoor inspection device 11 and the backdoor inspection device 21), a first backdoor inspection device 11 may perform backdoor inspection on a part of the prescribed software. Further, among the plurality of backdoor inspection devices, a second backdoor inspection device 21 may perform backdoor inspection on a part of the prescribed software different from the part of the prescribed software on which the first backdoor inspection device 11 performed the backdoor inspection.

Then, the user device 12b may determine presence or absence of a backdoor in the prescribed software based on a backdoor inspection certificate issued by the backdoor inspection device 11 and a backdoor inspection certificate issued by the backdoor inspection device 21.

Note that the term "backdoor" refers to a hidden or additional function that the user who uses the equipment (the user device 12b) is not aware of and that is a rogue or undesirable function in the software. Analyzing the function and structure of software and identifying the presumed code that is presumed to be a backdoor from the software may be referred to as "backdoor analysis". The presumed code is a code that is highly suspicious and likely to be a backdoor.

The certificate issuance means 112 issues a backdoor inspection certificate including the result of the backdoor inspection. The result of the backdoor inspection includes whether or not there is a backdoor in the prescribed software.

The backdoor inspection certificate includes information about the backdoor inspection and information that associates the information about the backdoor inspection with the prescribed software.

One of the plurality of the databases, for example, the database 14, has a registration means 141 and a transmission means 142.

The registration means 141 obtains a backdoor inspection certificate from the backdoor inspection device 11 and registers the backdoor inspection certificate.

The transmission means 142 transmits a backdoor inspection certificate to the user device 12*b*.

The user device 12*b* has a communication counterpart verification means 121.

Further, the communication counterpart verification means 121 may acquire the backdoor inspection certificate from the database 14. The communication counterpart verification means 121 determines, based on a plurality of backdoor inspection certificates, whether or not communication with the communication counterpart device 12*a* is permitted.

The communication counterpart verification means 121 of the user device 12*b* may determine that there is no backdoor in the prescribed software in the case where all of the backdoor inspection certificates indicate that there is no backdoor in the prescribed software. Then, in such a case, the user device 12*b* may determine that communication with the counterpart device 12*a* is permitted.

Further, the communication counterpart verification means 121 may determine that there is no backdoor in the prescribed software in the case where the backdoor inspection certificate above the threshold value indicates that there is no backdoor in the prescribed software. Then, in such a case, the user device 12*b* may determine that communication with the counterpart device 12*a* is permitted.

Further, the user device 12*b* has a list of backdoor inspection trustability of the backdoor inspection device 11, and may determine presence or absence of backdoors in the prescribed software based on the backdoor inspection trustability. That is, each of the plurality of the backdoor inspection devices may have backdoor inspection trustability indicating trustability of the result of the backdoor inspection. Then, the user device 12*b* may determine that there is no backdoor in the prescribed software in the case where the backdoor inspection certificate issued by a backdoor inspection device 11*p* whose backdoor inspection trustability is above the trustability threshold value indicates that there is no backdoor in the prescribed software. Then, in such a case, the user device 12*b* may determine that communication with the counterpart device 12*a* is permitted.

Further, the user device 12*b* may determine that there is no backdoor in the prescribed software in the case where the backdoor inspection certificate issued by the certification authority (an inspection authority) that is highly trustful indicates that there is no backdoor.

Further, the user device 12*b* may determine that there is no backdoor in the prescribed software in the case where the backdoor inspection certificate including the result of the backdoor inspection performed by an inspector who is highly trustful indicates that there is no backdoor in the prescribed software.

Further, a case where a plurality of backdoor inspection devices perform backdoor inspection on the prescribed software installed in the counterpart device 12*a* is studied. In this case, when the backdoor inspection device has not performed backdoor inspection on the entire prescribed software, the user device 12*b* may regard the backdoor inspection certificate invalid and determine not to permit communication with the counterpart device 12*a*.

Further, the user device 12*b* may determine that communication with the counterpart device 12*a* is permitted in the case where the backdoor inspection device has performed backdoor inspection on a specific software among the prescribed software.

The backdoor inspection device 11 issues a backdoor inspection certificate that includes information about the backdoor inspection and information that associates the information about the backdoor inspection with the prescribed software. A third party who uses the user device 12*b* acquires a plurality of backdoor inspection certificates that are associated with the prescribed software by using the user device 12*b*. The user device 12*b* verifies whether or not there is a backdoor contained in the prescribed software based on the plurality of the backdoor inspection certificates and determines whether or not communication with the counterpart device 12*a* is to be permitted. In this way, a system, a method, and a non-transitory computer-readable medium that can increase trustability of software as to whether or not there is a backdoor in the prescribed software can be provided.

Note that the code may be a source code or an execution code. A plurality of codes may be collectively referred to as a code block.

The details of the configuration of the backdoor inspection device according to the first example embodiment will be described. Here, explanation will be given by referring to a case in which a system that uses a backdoor inspection certificate is a system that includes the user device 12*b* and the counterpart device 12*a* that communicates with the user device 12*b*.

Figure 2:
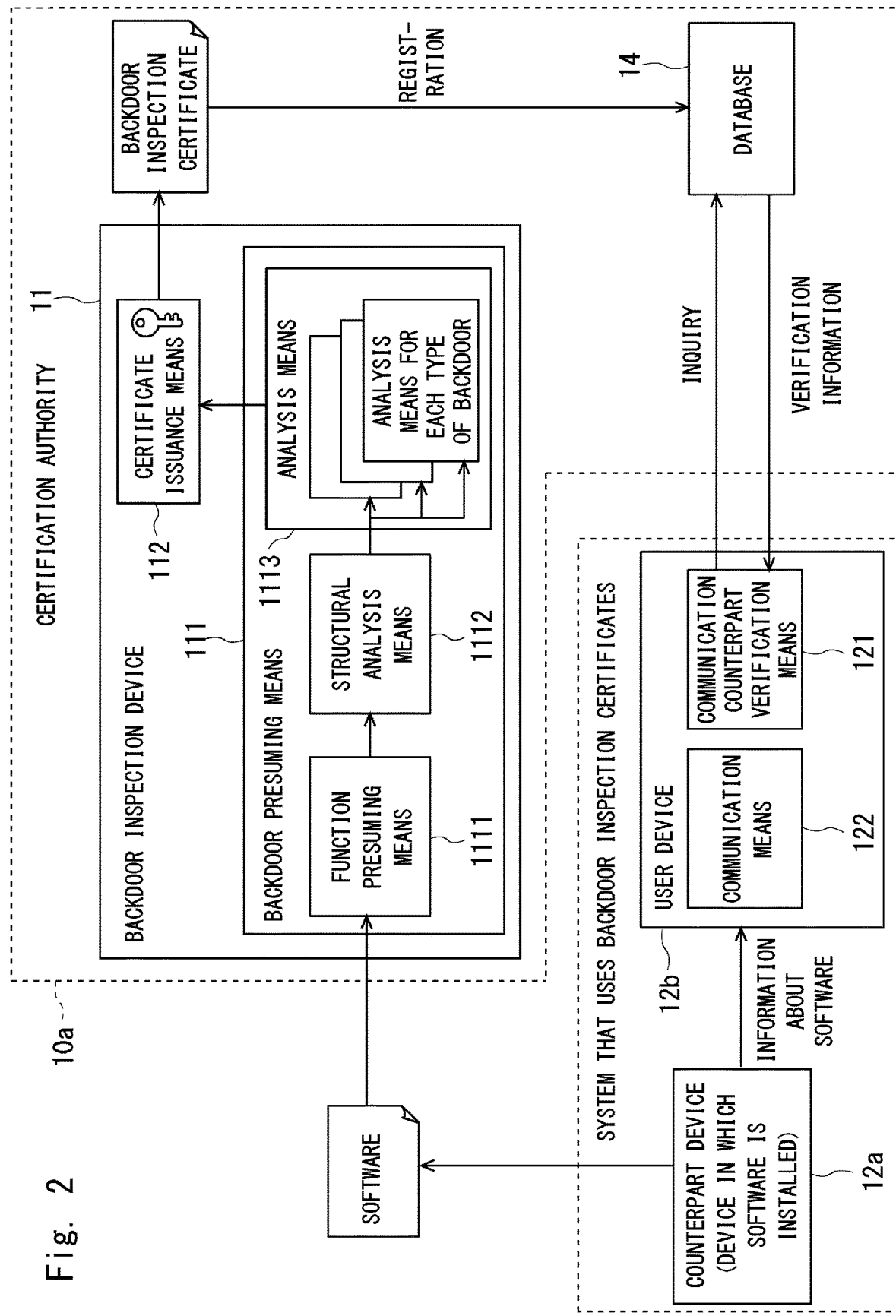
FIG. 2 is a block diagram illustrating the backdoor inspection device according to the first example embodiment.

FIG. 2 is a block diagram illustrating the backdoor inspection device according to the first example embodiment.

FIG. 2 illustrates the details of FIG. 1. For the sake of simplification, FIG. 2 shows a case in which there is only one certification authority.

As illustrated in FIG. 2, the backdoor presuming means 111 of the backdoor inspection device 11 has a function presuming means 1111, a structural analysis means 1112, and an analysis means 1113.

The function presuming means 1111 presumes a specific function, such as an interface function, an authentication function, and a command parser function, in the software.

Specifically, the structural analysis means 1112 extracts a plurality of functions included in the control flow and presumes each function, starting from the presumed specific function. The structural analysis means 1112 separates the presumed functions for each type.

The analysis means 1113 has an analysis means for each type of backdoor. The analysis means 1113 compares the separated function and the associated backdoor for each type of backdoor by using the analysis means for each type of backdoor. As the result of the comparison, the analysis means 1113 presumes whether the function is a backdoor and identifies a presumed code that is presumed to be a backdoor in the software. Alternatively, the analysis means 1113 may inspect the entire software regardless of individual functions.

The certificate issuance means 112 issues a backdoor inspection certificate. The backdoor inspection certificate includes the location information of the presumed code in the software when a backdoor is contained in the software.

The backdoor certificate may include at least one of the hash value of the software, the name of the software, and the signature of the own device (the backdoor inspection device 11) that inspected the backdoor. By including the signature of the backdoor inspection device 11 in the certificate, it is possible to prove that the backdoor inspection device 11 has performed the backdoor inspection.

The backdoor inspection certificate may include at least one of the following information: the version of the backdoor inspection device 11 that performed the backdoor inspection, the ID of the analyst who performed the analysis by using the backdoor inspection device 11, the signature of the analyst, the organization to which the analyst belongs, and the name of the analyst. The certificate may also include the date of the analysis.

Second Example Embodiment

Figure 3:
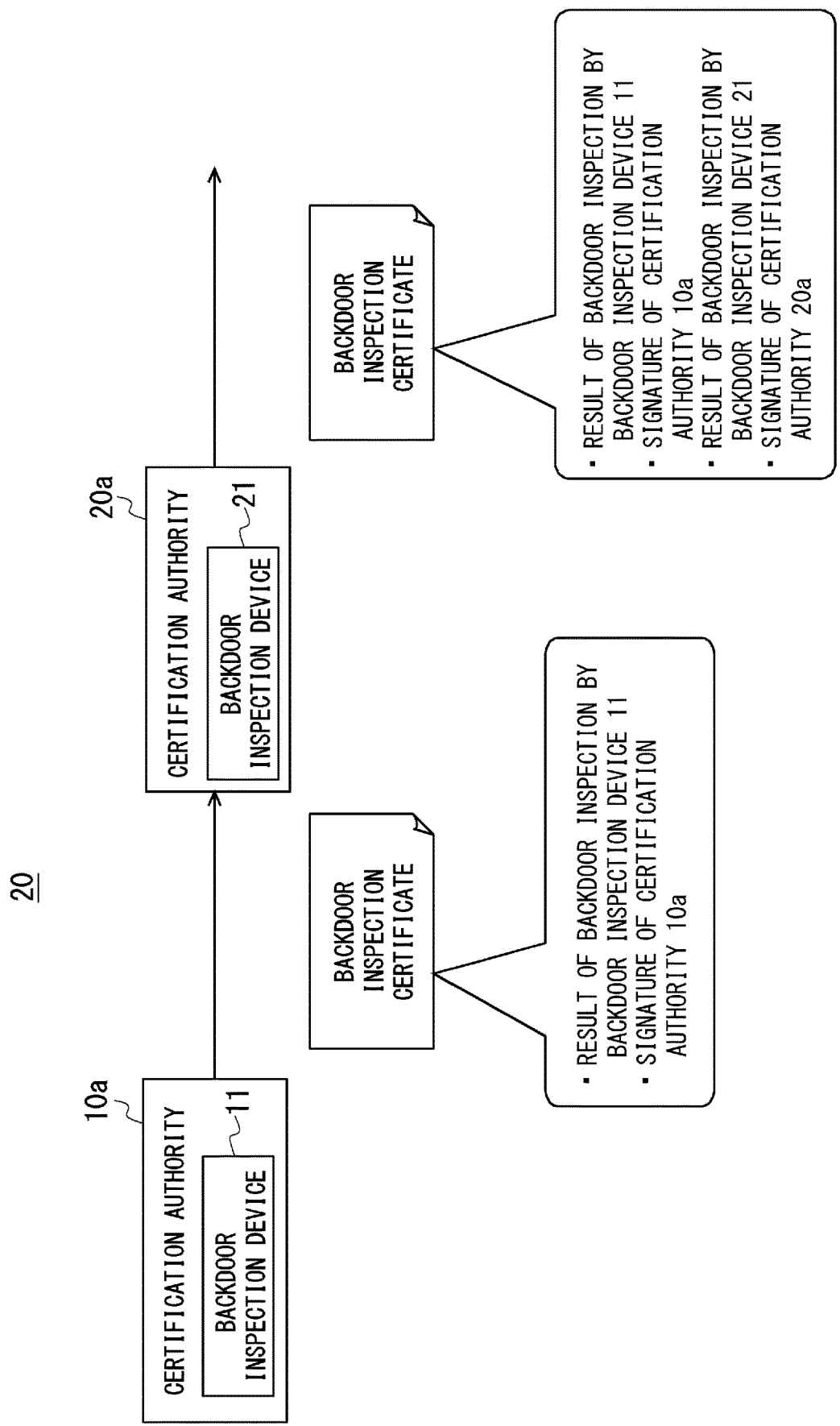
FIG. 3 is a block diagram illustrating a system according to a second example embodiment.

FIG. 3 is a block diagram illustrating a system according to a second example embodiment.

In FIG. 3, elements other than the certification authorities are omitted for the sake of simplification.

As shown in FIG. 3, a system 20 according to the second example embodiment differs from the system 10 according to the first example embodiment in that the result of the backdoor inspection and the like are added to the backdoor inspection certificate every time a certification authority (a backdoor inspection device) performs backdoor inspection.

Specifically, the first backdoor inspection device 11 among the plurality of backdoor inspection devices performs backdoor inspection on a part of the prescribed software and acquires the result of the first backdoor inspection. The certification authority 10a performs backdoor inspection using the first backdoor inspection device 11 it owns. The first backdoor inspection device 11 issues a first backdoor inspection certificate. The first backdoor inspection certificate includes the result of the inspection performed by the backdoor inspection device 11 and a signature of the certification authority 10a.

A second backdoor inspection device 21 among the plurality of backdoor inspection devices performs backdoor inspection on a part of the prescribed software different from the part of the prescribed software on which the first backdoor inspection device performed the backdoor inspection and acquires the result of the second backdoor inspection. The certification authority 20a performs backdoor inspection using the second backdoor inspection device 21 it owns. The second backdoor inspection device 21 issues a second backdoor inspection certificate. The second backdoor inspection certificate includes the result of the backdoor inspection performed by the backdoor inspection device 11, a signature of the certification authority 10a, the result of the backdoor inspection performed by the backdoor inspection device 21, and a signature of the certification authority 20a.

That is, the second backdoor inspection device 21 adds, to the result of the backdoor inspection performed by the first backdoor inspection device, the result of the backdoor inspection performed by the second backdoor inspection device, which is a result of the backdoor inspection performed on a part of the prescribed software different from the part of the prescribed software on which the first backdoor inspection device performed the backdoor inspection, and issues a second backdoor inspection certificate.

As described above, in the system 20 according to the second example embodiment, the backdoor inspection certificates are merged at the certification authority 20a side that issues the backdoor inspection certificates and not at the user device 12b side that uses the backdoor inspection certificates. In this way, the cost for the user device 12b to acquire the respective backdoor certificates from a plurality of certification authorities can be reduced.

Third Example Embodiment

Figure 4:
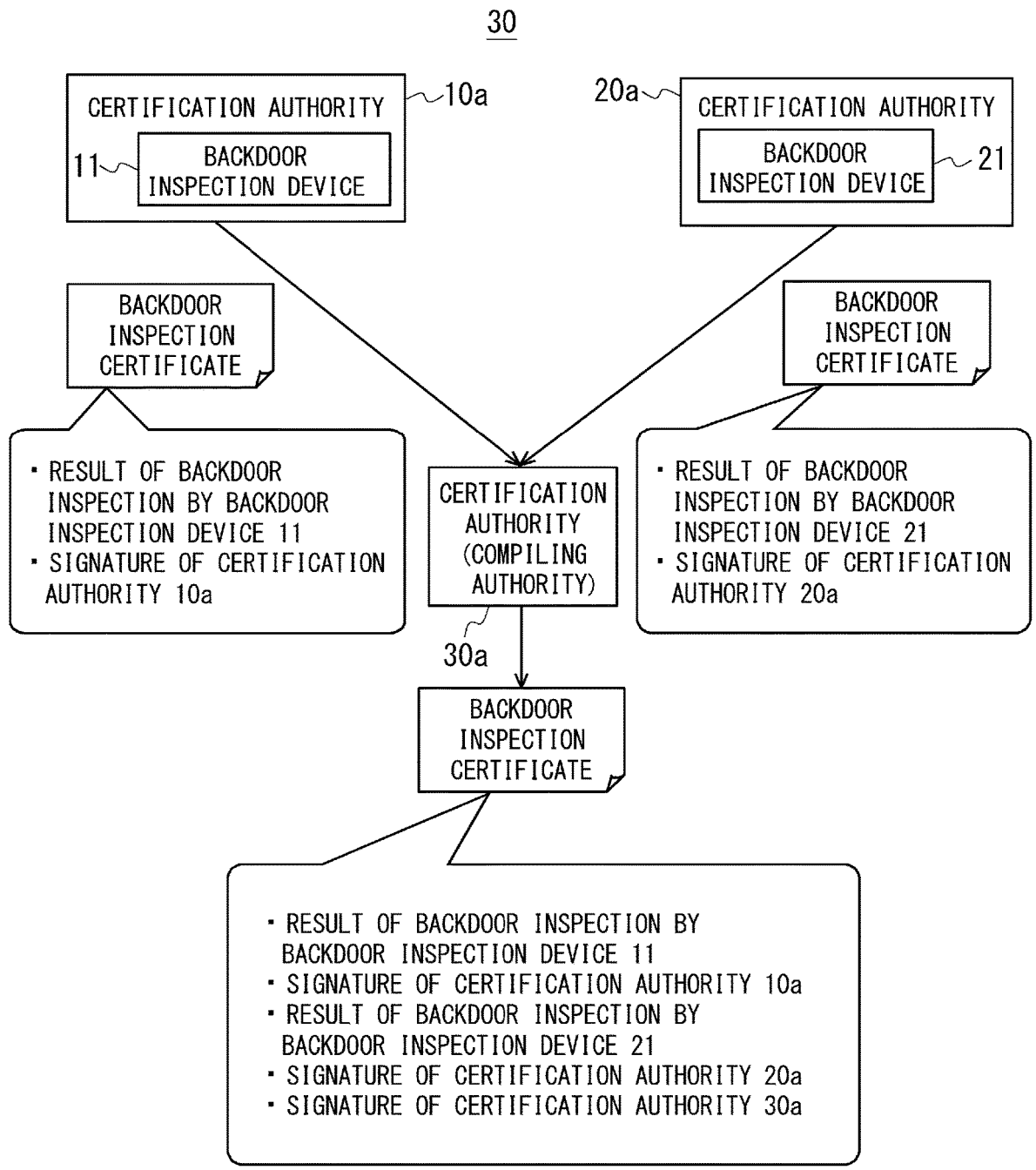
FIG. 4 is a block diagram illustrating a system according to a third example embodiment.

FIG. 4 is a block diagram illustrating a system according to a third example embodiment. In FIG. 4, elements other than the certification authorities are omitted for the sake of simplification.

As shown in FIG. 4, a system 30 according to the third example embodiment differs from the system 10 according to the first example embodiment in that the system 30 includes a certification compilation authority for compiling the result of backdoor inspection performed by a plurality of certification authorities (the backdoor inspection devices).

Specifically, the first backdoor inspection device 11 performs backdoor inspection on a part of the prescribed software, acquires the result of the first backdoor inspection, and then issues the first backdoor inspection certificate. The first backdoor inspection certificate includes the result of the backdoor inspection performed by the backdoor inspection device 11 and a signature of the certification authority 10a.

The second backdoor inspection device 21 performs backdoor inspection on a part of the prescribed software different from the part of the prescribed software on which the first backdoor inspection device performed the backdoor inspection, acquires the result of the second backdoor inspection, and then issues the second backdoor inspection certificate. The second backdoor inspection certificate includes the result of the backdoor inspection performed by the backdoor inspection device 21, and a signature of the certification authority 20a.

A certification authority 30a for compiling the plurality of the results of the backdoor inspection issues a new backdoor inspection certification obtained by merging the result of the first backdoor inspection performed by the first backdoor inspection device on a part of the prescribed software and the result of the second backdoor inspection performed by the second backdoor inspection device on a part of the prescribed software different from the part of the prescribed software on which the first backdoor inspection device performed the backdoor inspection. The new backdoor inspection certificate includes a signature of the certification authority 30a in addition to the result of the backdoor inspection performed by the backdoor inspection device 11, a signature of the certification authority 10a, the result of backdoor inspection performed by the backdoor inspection apparatus 21, and the signature of the certification authority 20a.

As described above, the system 30 according to the third example embodiment includes the certification authority 30a for compiling the results of the backdoor inspection performed by a plurality of certification authorities (the backdoor inspection devices). In this way, the cost for the user device 12b to acquire the respective backdoor certificates from a plurality of certification authorities can, as in the system according to the second example embodiment, be reduced.

Although the present invention has been described as a hardware configuration in the above example embodiments, the present invention is not limited thereto. The present invention can also be realized by causing a CPU (Central Processing Unit) to execute a computer program for processing of each component.

The above-described program can be stored by using any of various types of non-transitory computer-readable media and supplied to a computer. The non-transitory computer-readable media include various types of tangible storage media. Examples of non-transitory computer-readable media include magnetic storage media (specifically, flexible disks, magnetic tapes, and hard disk drives), magneto-optical storage media (specifically, magneto-optical disks), CD-ROM (Read Only Memory), CD-R, CD-R/W, semiconductor memory (specifically, mask ROM, PROM (Programmable ROM), EPROM (Erasable PROM)), flash ROM, and RAM (Random Access Memory). The program may also be supplied to a computer through any of various types of transitory computer-readable media. Examples of the transitory computer-readable media include electrical, optical, and electromagnetic waves. The transitory computer-readable media can supply the program to a computer via a wired communication path, such as an electric wire and an optical fiber, or a wireless communication path.

Although the present invention has been described with reference to the example embodiments described above, the present invention is not limited to the above. Various changes that can be understood by those skilled in the art can be made to the configuration and details of the present disclosure within the scope of the present invention.

Note that the present invention is not limited to the above-described example embodiments, and may be changed as appropriate without departing from the principle of the present invention.

Some or all of the above example embodiments may also be described as in the following Supplementary Notes, but are not limited to the following.

Supplementary Note 1

A system comprising:
a plurality of backdoor inspection devices;
a plurality of databases; and
a user device, wherein
  each of the plurality of the backdoor inspection devices includes:
    a backdoor presuming means for performing backdoor inspection on a prescribed software installed in a counterpart device that communicates with the user device and presumes whether or not there is a backdoor in the prescribed software;
    a certificate issuance means for issuing a backdoor inspection certificate including a result of the backdoor inspection, each of the plurality of the databases includes:
    a registration means for registering the backdoor inspection certificate; and
    a transmission means for transmitting the backdoor inspection certificate, and
  the user device includes
    a communication counterpart verification means for acquiring the backdoor inspection certificate from each of the plurality of the databases and determining, based on a plurality of the backdoor inspection certificates, whether or not communication with the counterpart device is permitted.

Supplementary Note 2

The system according to Supplementary Note 1, wherein each of the plurality of the backdoor inspection devices performs the backdoor inspection on the entire prescribed software.

Supplementary Note 3

The system according to Supplementary Note 1, wherein
  among the plurality of the backdoor inspection devices, a first backdoor inspection device performs the backdoor inspection on a part of the prescribed software, and
  among the plurality of the backdoor inspection devices, a second backdoor inspection device performs the backdoor inspection on a part of the prescribed software different from the part of the prescribed software on which the first backdoor inspection device performed the backdoor inspection.

Supplementary Note 4

The system according to Supplementary Note 3, wherein the second backdoor inspection device adds, to the result of inspection performed by the first backdoor inspection device on the part of the prescribed software, a result of inspection performed by the second backdoor inspection device, which is a result of the backdoor inspection performed on a part of the prescribed software different from the part of the prescribed software on which the first backdoor inspection device performed the backdoor inspection, and issues a second backdoor inspection certificate.

Supplementary Note 5

The system according to Supplementary Note 3, further comprising a certification authority for issuing a new backdoor inspection certificate obtained by merging the result of the first backdoor inspection performed by the first backdoor inspection device on a part of the prescribed software and the result of the second backdoor inspection performed by the second backdoor inspection device on a part of the prescribed software different from the part of the prescribed software on which the first backdoor inspection device performed the backdoor inspection.

Supplementary Note 6

The system according to any one of Supplementary Notes 1 to 5, wherein the user device determines that there is no backdoor in the prescribed software in the case where all of the backdoor inspection certificates indicate that there is no backdoor in the prescribed software.

Supplementary Note 7

The system according to any one of Supplementary Notes 1 to 5, wherein the user device determines that there is no backdoor in the prescribed software in the case where the backdoor inspection certificate above a threshold value indicates that there is no backdoor in the prescribed software.

Supplementary Note 8

The system according to any one of Supplementary Notes 1 to 5, wherein
  each of the plurality of the backdoor inspection devices has backdoor inspection trustability indicating trustability of the result of the backdoor inspection, and
  the user device determines that there is no backdoor in the prescribed software in the case where the backdoor inspection certificate issued by the backdoor inspection device whose backdoor inspection trustability is above a trustability threshold value indicates that there is no backdoor in the prescribed software.

Supplementary Note 9

The system according to any one of Supplementary Notes 1 to 8, wherein the plurality of the backdoor inspection devices are owned by the respective backdoor certification authorities for the respective backdoor inspection devices.

Supplementary Note 10

The system according to any one of Supplementary Notes 1 to 9, wherein the result of the backdoor inspection includes whether or not there is the backdoor in the prescribed software.

Supplementary Note 11

The system according to any one of Supplementary Notes 1 to 10, wherein the backdoor presuming means performs the backdoor inspection on the prescribed software by analyzing function and structure of the prescribed software and identifying a presumed code that is presumed to be the backdoor from the prescribed software.

Supplementary Note 12

The system according to any one of Supplementary Notes 1 to 11, wherein the backdoor inspection certificate further includes information about the backdoor inspection and information that associates the information about the backdoor inspection with the prescribed software.

Supplementary Note 13

A method for a system comprising:
a plurality of backdoor inspection devices;
a plurality of databases; and
a user device, wherein
  each of the plurality of the backdoor inspection devices is configured to:
    perform backdoor inspection on a prescribed software installed in a counterpart device that communicates with the user device and presume whether or not there is a backdoor in the prescribed software; and
    issue a backdoor inspection certificate including a result of the backdoor inspection, each of the plurality of the databases is configured to:
    register the backdoor inspection certificate; and
    transmit the backdoor inspection certificate, and the user device is configured to:
    acquire the backdoor inspection certificate from each of the plurality of the databases; and
    determine, based on a plurality of the backdoor inspection certificates, whether or not communication with the counterpart device is permitted.

Supplementary Note 14

A non-transitory computer-readable medium that stores a program that causes a computer to perform a method for a system comprising:
a plurality of backdoor inspection devices;
a plurality of databases; and
a user device, wherein
  each of the plurality of the backdoor inspection devices is configured to:
    perform backdoor inspection on a prescribed software installed in a counterpart device that communicates with the user device and presume whether or not there is a backdoor in the prescribed software; and
    issue a backdoor inspection certificate including a result of the backdoor inspection, each of the plurality of the databases is configured to:
    register the backdoor inspection certificate; and
    transmit the backdoor inspection certificate, and the user device is configured to:
    acquire the backdoor inspection certificate from each of the plurality of the databases; and
    determine, based on a plurality of the backdoor inspection certificates, whether or not communication with the counterpart device is permitted.

REFERENCE SIGNS LIST

10: SYSTEM
10a, 20a: CERTIFICATION AUTHORITY
11, 21: BACKDOOR INSPECTION DEVICE
111: BACKDOOR PRESUMING MEANS
1111: FUNCTION PRESUMING MEANS
1112: STRUCTURAL ANALYSIS MEANS
1113: ANALYSIS MEANS
112: CERTIFICATE ISSUANCE MEANS
12b: USER DEVICE
121: COMMUNICATION COUNTERPART VERIFICATION MEANS
12a: COUNTERPART DEVICE
121: COMMUNICATION COUNTERPART VERIFICATION MEANS
14, 24: DATABASE
141: REGISTRATION MEANS
142: TRANSMISSION MEANS

What is claimed is:
1. A system comprising:
a plurality of backdoor inspection devices;
a plurality of databases; and
a user device, wherein
  each of the plurality of the backdoor inspection devices includes:
    at least one backdoor-memory storing backdoor-instructions, and
    at least one backdoor-processor configured to execute the backdoor-instructions to;
      perform backdoor inspection on a prescribed software installed in a counterpart device that communicates with the user device and presume whether or not there is a backdoor in the prescribed software; and issue a backdoor inspection certificate including a result of the backdoor inspection, each of the plurality of the databases includes:
at least one database-memory storing database-instructions, and
at least one database-processor configured to execute the database-instructions to;
register the backdoor inspection certificate; and
transmit the backdoor inspection certificate, and the user device includes
at least one user-memory storing user-instructions, and
at least one user-processor configured to execute the user-instructions to;
acquire the backdoor inspection certificate from each of the plurality of the databases and determining, based on a plurality of the backdoor inspection certificates, whether or not communication with the counterpart device is permitted, wherein among the plurality of the backdoor inspection devices, a first backdoor inspection device performs the backdoor inspection on a part of the prescribed software, among the plurality of the backdoor inspection devices, a second backdoor inspection device performs the backdoor inspection on a part of the prescribed software different from the part of the prescribed software on which the first backdoor inspection device performed the backdoor inspection, and the second backdoor inspection device adds, to the result of inspection performed by the first backdoor inspection device on the part of the prescribed software, a result of inspection performed by the second backdoor inspection device, which is a result of the backdoor inspection performed on a part of the prescribed software different from the part of the prescribed software on which the first backdoor inspection device performed the backdoor inspection, and issues a second backdoor inspection certificate.

2. The system according to claim 1, wherein each of the plurality of the backdoor inspection devices performs the backdoor inspection on the entire prescribed software.

3. The system according to claim 1, further comprising a certification authority for issuing a new backdoor inspection certificate obtained by merging the result of the first backdoor inspection performed by the first backdoor inspection device on a part of the prescribed software and the result of the second backdoor inspection performed by the second backdoor inspection device on a part of the prescribed software different from the part of the prescribed software on which the first backdoor inspection device performed the backdoor inspection.

4. The system according to claim 1, wherein the user device determines that there is no backdoor in the prescribed software in the case where all of the backdoor inspection certificates indicate that there is no backdoor in the prescribed software.

5. The system according to claim 1, wherein the user device determines that there is no backdoor in the prescribed software in the case where the backdoor inspection certificate above a threshold value indicates that there is no backdoor in the prescribed software.

6. The system according to claim 1, wherein
each of the plurality of the backdoor inspection devices has backdoor inspection trustability indicating trustability of the result of the backdoor inspection, and
the user device determines that there is no backdoor in the prescribed software in the case where the backdoor inspection certificate issued by the backdoor inspection device whose backdoor inspection trustability is above a trustability threshold value indicates that there is no backdoor in the prescribed software.

7. The system according to claim 1, wherein the plurality of the backdoor inspection devices are owned by the respective backdoor certification authorities for the respective backdoor inspection devices.

8. The system according to claim 1, wherein the result of the backdoor inspection includes whether or not there is the backdoor in the prescribed software.

9. The system according to claim 1, wherein the at least one backdoor-processor configured to perform the backdoor inspection on the prescribed software by analyzing function and structure of the prescribed software and identifying a presumed code that is presumed to be the backdoor from the prescribed software.

10. The system according to claim 1, wherein the backdoor inspection certificate further includes information about the backdoor inspection and information that associates the information about the backdoor inspection with the prescribed software.

11. A method comprising:
performing, by each of a plurality of backdoor inspection devices, backdoor inspection on a prescribed software installed in a counterpart device that communicates with a user device to determine whether or not there is a backdoor in the prescribed software;
issuing, by each of the plurality of the backdoor inspection devices, a backdoor inspection certificate including a result of the backdoor inspection;
registering, by each of a plurality of databases, the backdoor inspection certificate; and
transmitting, by each of the plurality of the databases, the backdoor inspection certificate;
acquiring, by the user device, the backdoor inspection certificate from each of the plurality of the databases; and
determining, by the user device and based on a plurality of the backdoor inspection certificates, whether or not communication with the counterpart device is permitted, wherein
among the plurality of the backdoor inspection devices, a first backdoor inspection device performs the backdoor inspection on a part of the prescribed software,
among the plurality of the backdoor inspection devices, a second backdoor inspection device performs the backdoor inspection on a part of the prescribed software different from the part of the prescribed software on which the first backdoor inspection device performed the backdoor inspection, and
the second backdoor inspection device adds, to the result of inspection performed by the first backdoor inspection device on the part of the prescribed software, a result of inspection performed by the second backdoor inspection device, which is a result of the backdoor inspection performed on a part of the prescribed software different from the part of the prescribed software on which the first backdoor inspection device performed the backdoor inspection, and issues a second backdoor inspection certificate.

12. A non-transitory computer-readable medium that stores a program that causes a computer to perform a method for a system comprising:
a plurality of backdoor inspection devices;
a plurality of databases; and
a user device, wherein each of the plurality of the backdoor inspection devices is configured to:
  perform backdoor inspection on a prescribed software installed in a counterpart device that communicates with the user device and presume whether or not there is a backdoor in the prescribed software; and
  issue a backdoor inspection certificate including a result of the backdoor inspection,
each of the plurality of the databases is configured to:
  register the backdoor inspection certificate; and
  transmit the backdoor inspection certificate, and
the user device is configured to:
  acquire the backdoor inspection certificate from each of the plurality of the databases; and
  determine, based on a plurality of the backdoor inspection certificates, whether or not communication with the counterpart device is permitted, wherein
among the plurality of the backdoor inspection devices, a first backdoor inspection device performs the backdoor inspection on a part of the prescribed software,
among the plurality of the backdoor inspection devices, a second backdoor inspection device performs the backdoor inspection on a part of the prescribed software different from the part of the prescribed software on which the first backdoor inspection device performed the backdoor inspection, and
the second backdoor inspection device adds, to the result of inspection performed by the first backdoor inspection device on the part of the prescribed software, a result of inspection performed by the second backdoor inspection device, which is a result of the backdoor inspection performed on a part of the prescribed software different from the part of the prescribed software on which the first backdoor inspection device performed the backdoor inspection, and issues a second backdoor inspection certificate.

\* \* \* \* \*